United States Patent
Nelson et al.

(10) Patent No.: US 9,983,551 B2
(45) Date of Patent: *May 29, 2018

(54) INTELLIGENT SWITCHING

(71) Applicant: International Business Machines Corporation, Armonk, NY (US)

(72) Inventors: Mark A. Nelson, Poughkeepsie, NY (US); Kevin H. Peters, Germantown, NY (US); Louis R. Ruggiero, Sandy Hook, CT (US)

(73) Assignee: International Business Machines Corporation, Armonk, NY (US)

(*) Notice: Subject to any disclaimer, the term of this patent is extended or adjusted under 35 U.S.C. 154(b) by 162 days.

This patent is subject to a terminal disclaimer.

(21) Appl. No.: 14/844,672

(22) Filed: Sep. 3, 2015

(65) Prior Publication Data
US 2015/0378323 A1    Dec. 31, 2015

Related U.S. Application Data

(63) Continuation of application No. 13/930,039, filed on Jun. 28, 2013, now Pat. No. 9,164,496, which is a
(Continued)

(51) Int. Cl.
*G05B 9/02* (2006.01)
*F16P 3/14* (2006.01)
*G08B 21/02* (2006.01)

(52) U.S. Cl.
CPC .............. *G05B 9/02* (2013.01); *F16P 3/142* (2013.01); *G08B 21/02* (2013.01)

(58) Field of Classification Search
CPC ............. G05B 9/02; F16P 3/142; G08B 21/02
(Continued)

(56) References Cited

U.S. PATENT DOCUMENTS 3,953,770 A    4/1976 Hayashi
3,958,164 A    5/1976 Hess
(Continued)

FOREIGN PATENT DOCUMENTS

CN    21176875    1/2009
CN    101739841    6/2010
(Continued)

OTHER PUBLICATIONS

Office Action China Patent Office (dated Mar. 31, 2015) for patent application No. 201310002078.2; 5 pages.
(Continued)

*Primary Examiner* — Steven Lim
*Assistant Examiner* — Kam Ma
(74) *Attorney, Agent, or Firm* — Schmeiser, Olsen & Watts; Michael A. Petrocelli

(57) ABSTRACT

An intelligent switching method and system. The method includes retrieving by a computer processor of an intelligent switching device, detection data indicating that an individual is located within a specified proximity of an apparatus. The intelligent switching device is lockably attached to the apparatus. The computer processor receives a request from an individual for enabling the apparatus. The computer processor determines that the individual is in compliance with safety procedures associated with operating the apparatus and generates an enable signal. The enable signal enables a power signal for the apparatus. The computer processor indicates that the apparatus has been enabled and is operational.

17 Claims, 5 Drawing Sheets

Related U.S. Application Data continuation of application No. 12/817,256, filed on Jun. 17, 2010, now Pat. No. 8,514,085.

(58) Field of Classification Search
USPC ...................................................... 340/573.1
See application file for complete search history.

(56) References Cited

U.S. PATENT DOCUMENTS

| | | |
|---|---|---|
| 4,466,040 A | 8/1984 | Barthel et al. |
| 4,853,821 A | 8/1989 | Lewis |
| 5,023,597 A | 6/1991 | Salisbury |
| 5,164,707 A | 11/1992 | Rasmussen et al. |
| 5,193,665 A | 3/1993 | Jankow |
| 5,198,627 A | 3/1993 | Diaz et al. |
| 5,315,289 A | 5/1994 | Fuller et al. |
| 5,563,581 A | 10/1996 | Kats |
| 5,993,039 A | 11/1999 | Crill |
| 6,208,042 B1 | 3/2001 | Solis |
| 6,461,176 B1 | 10/2002 | Haas |
| 6,532,550 B1 | 3/2003 | Crew et al. |
| 6,664,888 B1 | 12/2003 | Bishop |
| 6,773,277 B2 | 8/2004 | Issa |
| 6,853,303 B2 | 2/2005 | Chen et al. |
| 6,856,852 B1 | 2/2005 | Bruinsma et al. |
| 6,903,624 B2 | 6/2005 | Stenberg et al. |
| 7,075,195 B2 | 7/2006 | Feil |
| 7,274,866 B2 | 9/2007 | Rudolf et al. |
| 7,619,504 B2 | 11/2009 | Cohen |
| 7,716,239 B2 | 5/2010 | Murez et al. |
| 7,890,235 B2 | 2/2011 | Self et al. |
| 8,208,681 B2 | 6/2012 | Heller et al. |
| 8,514,085 B2 | 8/2013 | Nelson et al. |
| 9,037,283 B2 | 5/2015 | Ellison-Marion et al. |
| 9,164,496 B2 | 10/2015 | Nelson et al. |
| 2002/0117902 A1 | 8/2002 | Evers et al. |
| 2003/0036822 A1 | 2/2003 | Davis et al. |
| 2004/0160129 A1 | 8/2004 | Dahlberg |
| 2005/0159184 A1 | 7/2005 | Kerner et al. |
| 2006/0027446 A1 | 2/2006 | Castaldo |
| 2006/0044140 A1 | 3/2006 | Berg |
| 2006/0268482 A1 | 11/2006 | Lin et al. |
| 2008/0319768 A1 | 12/2008 | Kreiner et al. |
| 2009/0040014 A1 | 2/2009 | Knopf et al. |
| 2009/0128306 A1 | 5/2009 | Luden et al. |
| 2009/0146799 A1 | 6/2009 | Goldstein et al. |
| 2009/0161918 A1 | 6/2009 | Heller et al. |
| 2009/0224868 A1 | 9/2009 | Liu et al. |
| 2009/0273436 A1 | 11/2009 | Gluck et al. |
| 2010/0034395 A1 | 2/2010 | Lundin |
| 2010/0045464 A1 | 2/2010 | Knopf et al. |
| 2010/0057944 A1 | 3/2010 | Eberhard |
| 2010/0265039 A1 | 10/2010 | Clements et al. |
| 2011/0295083 A1 | 12/2011 | Doelling et al. |
| 2011/0298616 A1 | 12/2011 | Foisy et al. |
| 2011/0309936 A1 | 12/2011 | Nelson et al. |
| 2012/0071017 A1 | 3/2012 | Gaul et al. |
| 2013/0178955 A1 | 7/2013 | Ellison-Marion et al. |
| 2013/0289748 A1 | 10/2013 | Nelson et al. |

FOREIGN PATENT DOCUMENTS

| | | |
|---|---|---|
| CN | 102307366 | 1/2012 |
| WO | 2004006466 | 8/2004 |

OTHER PUBLICATIONS

Office Action (dated Jan. 16, 2013) for U.S. Appl. No. 12/817,256, filed Jun. 17, 2010; Confirmation No. 5146.

Amendment filed Mar. 18, 2013 in response to Office Action (dated Jan. 16, 2013) for U.S. Appl. No. 12/817,256, filed Jun. 17, 2010; Confirmation No. 5146.

Notice of Allowance (dated Apr. 15, 2013) for U.S. Appl. No. 12/817,256, filed Jun. 17, 2010; Confirmation No. 5146.

Notice of Allowance (dated Jan. 15, 2015) for U.S. Appl. No. 13/343,777, filed Jan. 5, 2012; Confirmation No. 6425.

Notice of Allowance (dated Jun. 5, 2015) for U.S. Appl. No. 13/930,039, filed Jun. 28, 2015; Confirmation No. 3089.

INTELLIGENT SWITCHING

This application is a continuation application claiming priority to Ser. No. 13/930,039 filed Jun. 28, 2013, which is a continuation application claiming priority to Ser. No. 12/817,256 filed Jun. 17, 2010, now U.S. Pat. No. 8,514,085 issued Aug. 20, 2013.

FIELD

The present invention relates to a method and associated apparatus for intelligently enabling and disabling an apparatus based on a user and associated protective gear.

BACKGROUND

Securing an apparatus typically comprises an inefficient process with little flexibility. An apparatus is typically activated without any regard to potential issues. Using an apparatus without any regard to potential issues may result in user safety issues.

SUMMARY

The present invention provides a method comprising: retrieving, by a computer processor of an intelligent switching device from a detection device, first detection data indicating that a first individual is located within a specified proximity of an apparatus, wherein the intelligent switching device is lockably attached to the apparatus; receiving, by the computer processor from the first individual, a request for enabling the apparatus; determining, by the computer processor, that the first individual is in compliance with safety procedures associated with operating the apparatus; generating, by the computer processor in response to the determining, an enable signal; enabling, by the enable signal generated by the computer processor, a power signal for the apparatus; and indicating, by the computer processor, that the apparatus has been enabled and is operational.

The present invention provides a intelligent switching device comprising a computer processor coupled to a computer-readable memory unit, the memory unit comprising instructions that when enabled by the computer processor implements a method comprising: retrieving, by the computer processor from a detection device, first detection data indicating that a first individual is located within a specified proximity of an apparatus, wherein the intelligent switching device is lockably attached to the apparatus; receiving, by the computer processor from the first individual, a request for enabling the apparatus; determining, by the computer processor, that the first individual is in compliance with safety procedures associated with operating the apparatus; generating, by the computer processor in response to the determining, an enable signal; enabling, by the enable signal generated by the computer processor, a power signal for the apparatus; and indicating, by the computer processor, that the apparatus has been enabled and is operational.

The present invention advantageously provides a simple method and associated system capable of securing an apparatus.

DETAILED DESCRIPTION

Figure 1:
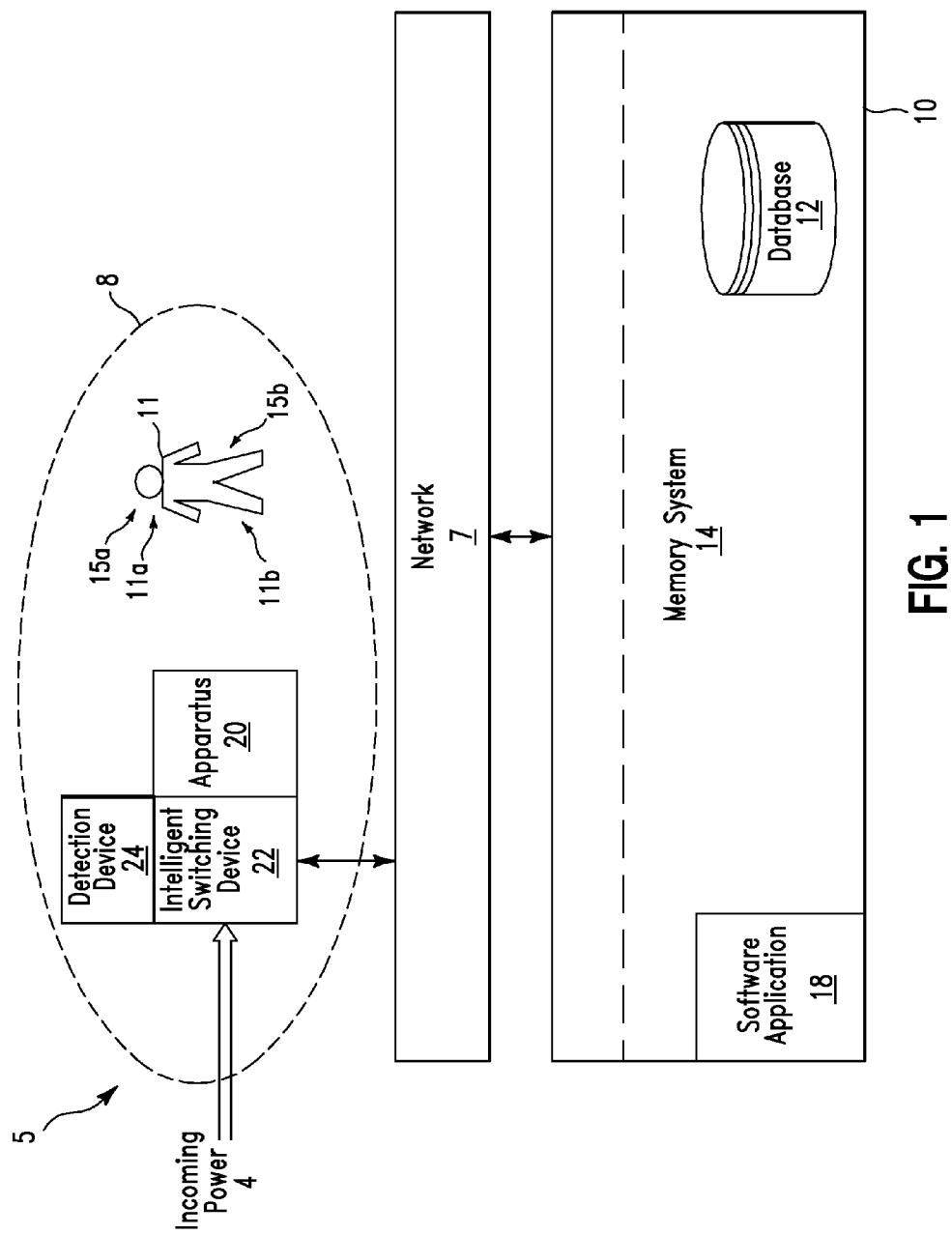
FIG. 1 illustrates a system comprising an intelligent switching device, in accordance with embodiments of the present invention.

FIG. 1 illustrates a system 5 comprising an intelligent switching device 22 for enabling or disabling an apparatus 20 based on detection of protective gear 15a and/or 15b correctly worn by a user 11 of apparatus 20, in accordance with embodiments of the present invention. Intelligent switching device 22 is lockably attached to apparatus 20 (e.g., lockably attached to a power cord for apparatus 20). Intelligent switching device 22 may be lockably attached to apparatus 20 using any type of locking device including, inter alia, a mechanical lock device (e.g., a locking cylinder with key), an electro/mechanical locking device (e.g., a solenoid, a stepper motor, etc), etc. Intelligent switching device 22 may be independent (i.e., a separate device) from apparatus 20. Alternatively, intelligent switching device 22 may be integral with (i.e., a part of) apparatus 20. Intelligent switching device 22 enables/disables an incoming power signal 4 (alternating current power or direct current such as battery power, or fuel cell power) for apparatus 20 based on detection of protective gear 15a and/or 15b correctly worn by a user 11 of apparatus 20. Apparatus 20 may comprise any electro/mechanical device requiring a user to wear protective gear. For example, apparatus 20 may comprise, inter alia, a saw, a drill, welding equipment, laboratory equipment, chemical equipment, machine shop equipment, automotive repair equipment, etc. Protective gear 15a may include any personal protective gear for protection a head/face area 11a of user 11 such as, inter alia, safety eyewear (e.g., glasses/safety glasses, goggles, shields, etc, respiratory equipment, etc. Protective gear 15b may include any protective gear for protection a body area 11b of user 11 such as, inter alia, body protective gear (e.g., gloves, boots, fall protection, etc), etc. Personal protective gear may be marked with a rating label (i.e., based on different classes and levels of eye protection within a class). The rating label may be granular enough to distinguish a type of machine/environment and use. Alternatively, existing safety gear may be retrofitted with an eye protection rating level label verified by local safety team.

System 5 retrieves data from a manufacturer of apparatus 20 or any other authorized source (e.g., safety representative). The data documents the use of apparatus 20 and/or any required safety equipment (i.e., for user 11) necessary for operation. Apparatus 20 may comprise a setting dial for multiple uses. The multiple uses for apparatus 20 may require specified types and/or levels of protective gear 15a or 15b required (i.e., for user 11) for operation of apparatus 20. Therefore, system 5 enables a process for detecting required safety equipment markings on one or more safety devices (e.g., protective gear 15a and 15b ). System 5 ensures user 11 (and/or additional users or bystanders) is correctly wearing one or more safety devices by sensing an appropriate safety equipment rating label within a unique zone (i.e., on user 11) for each safety device (e.g., based on a position in relation to users head/body or a facial recognition program). Additionally, system 5 enables a process for determining that user 11 is wearing one or more safety devices properly (e.g., safety glasses over the user's 11 eyes). The aforementioned process may be performed by detecting a specified zone on the user. The specified zone may be determined by, inter alia, a triangulation process, a radar/optical process, etc.

System 5 of FIG. 1 comprises intelligent switching device 22 (i.e., lockably attached to apparatus 20) connected through a network 7 to a computing system 10. Alternatively, intelligent switching device 22 and detection device 24 may be directly connected to computing system 14 without network 7. Additionally, detection device 24 may be comprised by intelligent switching device 22. System 5 additionally comprises a detection device 24 electrically connected to intelligent switching device 22. Intelligent switching device 22 comprises a tamper proof intelligent device capable of being updated (e.g., via computing system 10). Intelligent switching device 22 comprises the following features:

1. An end to end connector that attaches to and may be (key) locked to a male power plug of apparatus 20 (i.e., to be monitored).
2. The end to end connector comprises a built in safety (on/off) electro/mechanical switch controlled by intelligent hardware/software.
3. The intelligent hardware/software is permanently attached to the end to end connector via an electrical connection.
4. Internal/external detection device used as input to the intelligent hardware/software.
5. The end to end connector may optionally enable tamper proof methods for:
   A. Setting input parameters settings for the intelligent hardware/software (e.g., machine type, program type, etc).
   B. Uploading new code drivers to the intelligent hardware/software.
   C. Downloading log/audit details from the intelligent hardware/software.
6. The intelligent hardware/software is capable of running multiple intelligent programs simultaneously and/or in sequence. Additionally, the intelligent hardware/software is able to handle the several programs in relation to an on/off setting of the safety switch.
7. The end to end connector may be unlocked to gain access to a programmatic interface or to move the intelligent switching device 22 to another apparatus.

Detection device 24 may comprise any type of detection device capable of detecting:
1. Detecting that user 11 is located within a specified proximity 8 (or area) of apparatus 20.
2. Detecting that user 11 is correctly wearing any specified protective gear 15a and/or 15b (e.g., safety glasses are being worn over the user's eyes as opposed to being placed on the user's head).
3. Detecting that specified protective gear 15a and/or 15b includes unique markings indicating a correct type of protective gear associated with operating apparatus 20.
4. Detecting that the user is facing a proper direction with respect to apparatus 20 (e.g., the user is looking at operating apparatus 20 as opposed to looking away from apparatus 20).
5. Detecting a user and/or bystander position with respect to apparatus 20.

Detection device 24 may comprise, inter alia, a camera or any other type of optical device, etc. Network 7 may comprise any type of network including, inter alia, a local area network, (LAN), a wide area network (WAN), the Internet, etc. Computing system 10 may comprise any type of computing system(s) including, inter alia, a personal computer (PC), a server computer, a database computer, a controller, etc. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all retrieved detection and indication data and any log data. Software application 18 enables a method to:

1. Automatically detect if one or more people (e.g., user 11) have (optionally marked) protective gear 15a and/or 15b and are wearing them properly (i.e., on a proper location/unique zone on user 11). For example, software application 18 may automatically detect if user 11 is wearing safety glasses in front of their eyes as opposed to on top of their forehead.
2. Automatically detect if one or more people have recently put on or taken off protective gear 15a and/or 15b.
3. Enable or disable incoming power signal 4 (i.e., via intelligent switching device 22) for apparatus thereby preventing apparatus 20 from being operated until user 11 has placed uniquely marked protective gear 15a and/or 15b in a proper location.
4. Automatically detect if one or more people is wearing a correct level of protective gear 15a and/or 15b.
5. Automatically detect if another person besides an operator of apparatus 20 is in close proximity to apparatus 20 and if detected disable incoming power signal 4 for apparatus 20 (i.e., intelligent switching device 22) to disable apparatus 20 until the other person is no longer in close proximity to apparatus 20 thereby preventing distractions.
6. Automatic detection to ensure that user 11 is located in a correct (i.e., approved) position with respect to apparatus (e.g., not behind apparatus 20) and enabling intelligent switching device 22 to enable or disable power signal for apparatus 20 if user 11 is located in an incorrect position with respect to apparatus 20.
7. Enable a facial recognition process to validate proper protective gear is marked correctly.

Protective gear 15a and/or 15b is marked (i.e., for optical character recognition) with a rating label based on different classes and level of protection within that class. For example, safety glasses may be marked with a class rating label of welding and a level of protection comprising a specified tint level. System 5 may use a facial recognition process to ensure that protective gear 15a and/or 15b are on user 11 and then use an optical character recognition (OCR) process to recognize the makings on protective gear 15a and/or 15b. If the marking of protective gear 15a and/or 15b being worn is equal to or greater than a type required, continued use of the apparatus 20 is allowed. Otherwise computing system 10 enables intelligent switching device 22 to disable power to apparatus 20) in order to disable operation.

The following implementation example for enabling or disabling apparatus 20 (i.e., via a intelligent switching device 22) such as a table saw based on detection of protective gear correctly worn by a user of the apparatus is described as follows based on the following steps:
1. An administrator (e.g., an occupational safety and health administration (OSHA) official) for a company permanently mounts a facial recognition based camera (e.g., detection device 24) on the front of a table saw (e.g., apparatus 20).
2. The administrator enables (e.g., via pin settings or through a universal serial bus (USB) port) a notification that the device being connected is a table saw.
3. The administrator locks (via a locking cylinder comprising a key) an end to end safety switch (e.g., intelligent switching device 22) to the end of a male electrical plug for the table saw.
4. An operator (for the table saw) attempts to use table saw without safety glasses.
5. The table saw will not start (i.e., is disabled by the end to end safety switch) and the end to end safety switch generates an alarm to notify the operator.
6. In response, the operator puts the required safety glasses on and the table saw is enabled.
7. The operator uses the table saw.
8. The operator shuts off the table saw.
9. The operator moves the table saw and the end to end safety switch to another part of a job site (i.e., comprising a different electrical outlet).
10. The operator attempts to use the table saw without the required safety glasses.
11 The table saw will not start (i.e., is disabled by the end to end safety switch) and the end to end safety switch generates an alarm to notify the operator.
12. In response, the operator puts the required safety glasses on and the table saw is enabled.
13. The operator uses the table saw.
14. The operator shuts off the table saw.
15. At a future time, the administrator unlocks the end to end safety switch to upload a new driver level via the USB port. After the driver installation, the end to end safety switch is reattached.

In addition to controlling and/or sending updates to intelligent switching device 22, software application 18 may comprise a recognition component. The recognition component may be enabled to determine if a user's face is present and if he/she is wearing correct protective gear. In order to determine if the correct protective gear is being worn, optical character recognition code may be used to examine an image provided by the image capture device. The optical character recognition code will examine only an area of the user that is within a zone for the associated protective gear in order to determine if a required (or greater than a required) safety rating is present. If the safety rating of the protective gear being worn is equal to or greater than the safety rating needed by the apparatus/machine, the recognition component transmits an enable signal to intelligent switching device 22 for enabling operation of apparatus 20 otherwise apparatus 20 is put into an inoperable state. Additionally, the recognition component may be coded to recognize safety hats and masks as a face and to determine if the mask is in a correct position to protect a user's eyes. In order to associate a hat with a face, facial recognition code could find a body of a user using a facial recognition technique to detect/anticipate movement and occlusion. System 5 could then look for a safety rating in a specific eye zone based on a position of the body. If the mask is tilted up, a safety rating code will not be in the correct position to be detected and therefore apparatus 20 may be put into an inoperable state (i.e., via intelligent switching device 22). Additionally, authentication of a user identity may be required. Identifying a user allows detailed auditing of successful and unsuccessful use of an apparatus/machine and may be used to update safety and insurance records. The recognition component may be enabled to determine and/or generate the following:

A. A required level of safety equipment: A proper level of safety equipment may be determined based on equipment and environment. A specific level of safety equipment may be determined and required by country, state and/or company policies.
B. Facial profiles: In order to identify users for audit records or to compare against training, facial scans may be performed and results may be stored in a database (e.g., database 12). The facial profiles may be stored as, inter alia, a picture, an algorithmic extraction, etc. Additionally, the facial profiles may also be associated with a name and/or serial number.
C. Programmatic actions for intelligent switching device 22: Programmatic actions may be enabled (i.e., via intelligent switching device 22) to disable an operation of apparatus 20. The programmatic actions may enable a safety switch within intelligent switching device 22 thereby eliminating current to apparatus 20. Programmatic actions may comprise a recovery action (i.e., to reactive operation of apparatus 20). Data identifying the recovery action may be stored for future reference. Programmatic actions may be state driven. For example, a first programmatic action when starting apparatus 20 will not allow starting and will cause an indicator light to blink and a second programmatic action (i.e., if apparatus 20 is already in use) may cause the safety switch to open (i.e., to disable the apparatus/machine).
D. Audit records: Audit records may be generated at various levels (e.g., a number of violations, users that violated policies, a time/date of violations, etc). The audit records may be used to validate adherence to governmental and corporate safety regulations and to reduce a price of an insurance policy. An optical image could be captured into memory when person violates safety policies, as a different means of enforcement, if a full facial recognition program is not enabled. The images could be accessed by a local safety representative to handle.

Intelligent switching device 22 may comprise optional output devices (i.e., for enabling warning) such as, inter alia:
A. Speakers broadcasting a tone or audio/MP3/WAV message.
B. Lights that change colors or that flash.
C. Display device(s) that present error messages and/or codes. The error messages and/or codes may be transmitted using various techniques such as SMS messaging/text or note to a manager, etc.

Figure 2:
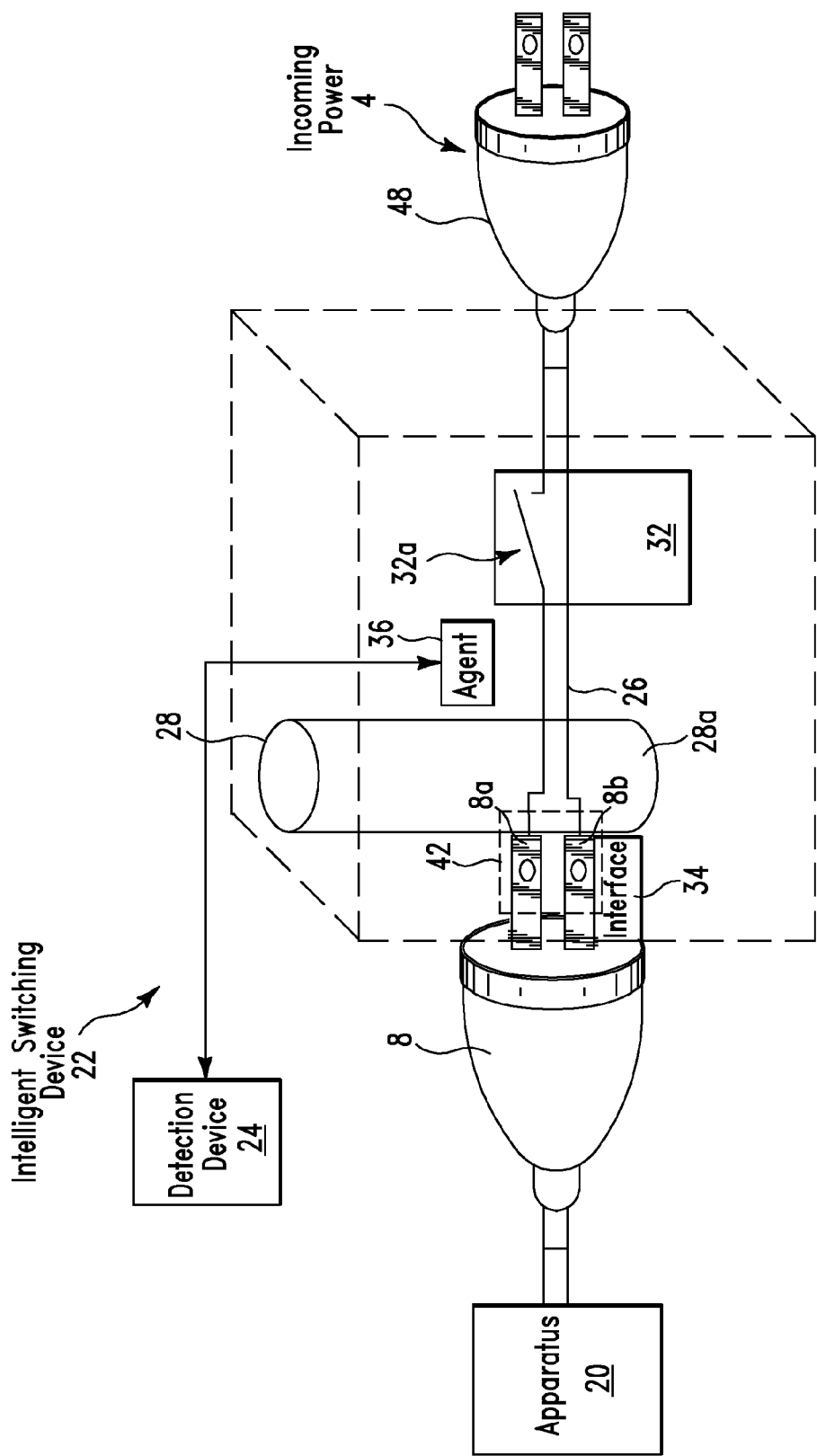
FIG. 2 illustrates a perspective view of the intelligent switching device of FIG. 1, in accordance with embodiments of the present invention.

FIG. 2 illustrates a perspective view of intelligent switching device 22 of FIG. 1, in accordance with embodiments of the present invention. Intelligent switching device 22 is lockably attached (i.e., via electrical receptacle 42) to a power plug 8 for apparatus 20. Power cord 26 comprises a plug end 48 for plugging into an electrical outlet/receptacle and receiving an incoming power signal 4 (e.g., AC or DC). Intelligent switching device 22 comprises the following components:
1. An electrical receptacle 42 for accepting and electrically connecting prongs 8a and 8b to power cord 26.
2. A locking cylinder 28- The locking cylinder may comprise a manual key driven locking tumbler which engages an internal locking mechanism for locking intelligent switching device 22 to prongs 8a and 8b and/or power plug 8. Alternatively, locking cylinder 28 may comprise any type of electro/mechanical device including, inter alia, a solenoid, a stepper motor, etc.

3. An internal locking mechanism 28a for locking prongs 8a and 8b to an internal switch 32a for disabling/enabling apparatus 20.
4. Intelligent agent 36 (i.e., software) receives IT analytics from an intelligent machine and based on an algorithm (i.e., implemented by the intelligent agent 36) enables a decision as to whether a switch 32a should be turned on or off. The intelligent agent 36 may be preloaded and its associated code could be upgraded.
5. Switching device 32 comprising switching portion 32a for enabling/disabling incoming power signal 4. Switching device may comprise, inter alia, a relay (mechanical or solid state), a contactor, etc.
6. Interface 34 (e.g., for receiving from computing system 10, parameter settings, uploads, downloads, etc) may comprise a pin setting device or a physical computer/electrical interface, such as, inter alia, a USB port. Interface 34 provides upload and/or download capabilities for intelligent switching device 22. A USB port could be connected to an electronic device (e.g., computing system 10, a personal computer, a personal digital assistant, a cell phone) that would optionally require authentication such as a license and/or encryption key provided when purchasing the intelligent agent or an upgrade. Any wireless communication between either an intelligent action or a connector to an authorized wireless device (personal computer, personal digital assistant, cell phone) would enable a process for updating instances or acquiring log data. Interface 34 may be located such that power plug 8 (i.e., locked in place) covers (thereby making tamper proof) interface 34.

Additionally, a Web based service could be used as a central location for an administrator to order intelligent agent systems and corresponding drivers as well as driver updates (if safety regulations and or auditing requirements were changed). The Web based service would know which drivers could run on which types of intelligent agents based on factors such as, inter alia, which type of sensor(s) are attached or a type of monitoring required.

Figure 3:
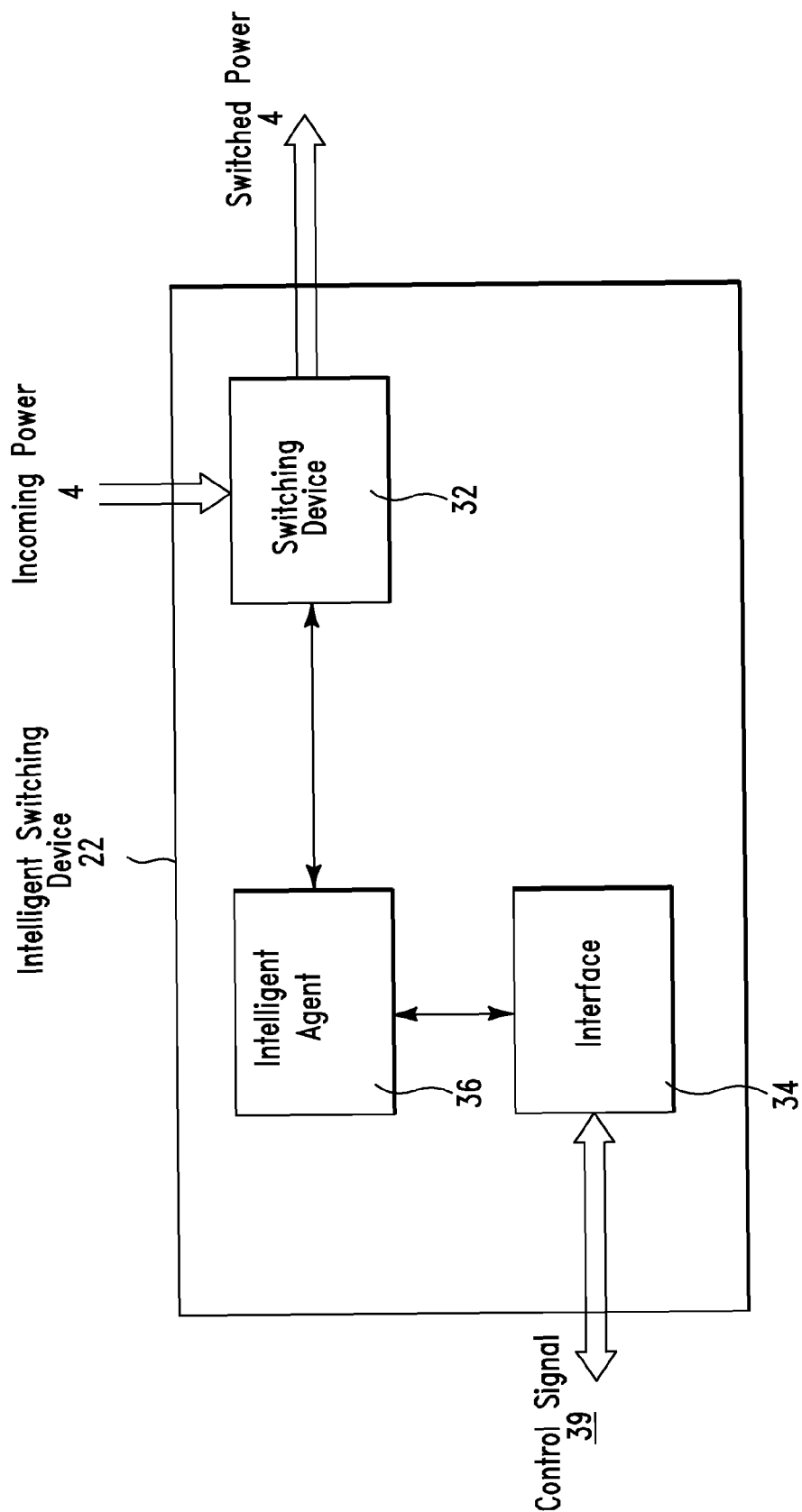
FIG. 3 illustrates a block diagram view of the intelligent switching device of FIG. 1, in accordance with embodiments of the present invention.

FIG. 3 illustrates a block diagram view of intelligent switching device 22 of FIG. 1, in accordance with embodiments of the present invention. An incoming control line 39 (e.g., from computing system 10) is lockably connected to interface 34. Interface 34 is connected to intelligent agent/sensors 36 for receiving code and updates. Intelligent agent/sensors 36 are connected to switching device 32 for controlling switch 32a. Switching device 32 controls a flow of incoming power signal 4 thereby enabling or disabling a switched power signal for apparatus 20 of FIG. 1.

Figure 4:
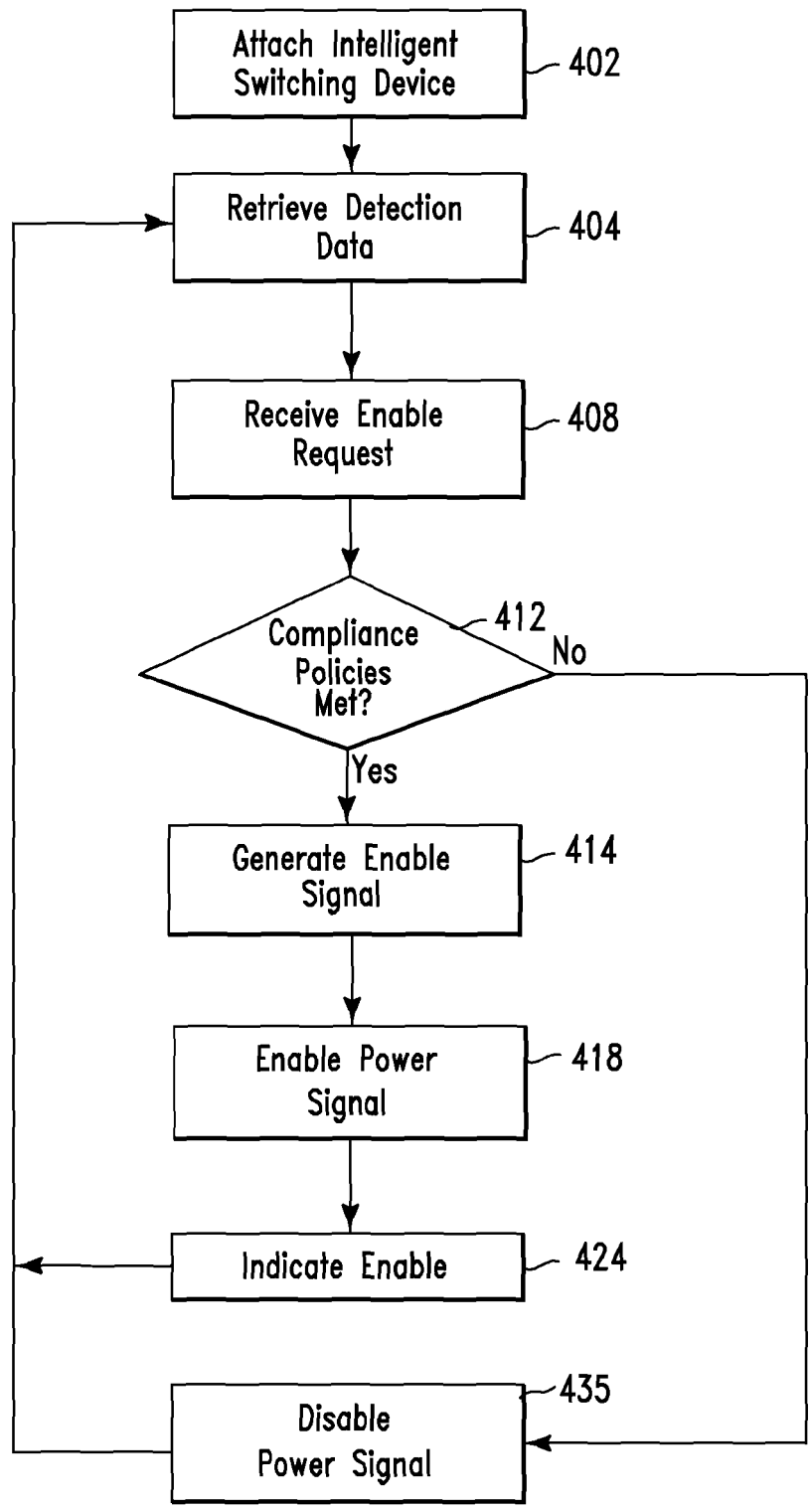
FIG. 4 illustrates a flowchart describing an algorithm used by the intelligent switching device of FIG. 1, in accordance with embodiments of the present invention.

FIG. 4 illustrates a flowchart describing an algorithm used by system 5 comprising intelligent switching device 22 of FIG. 1 for enabling or disabling an apparatus based on detection of protective gear correctly worn by a user of the apparatus, in accordance with embodiments of the present invention. In step 402, an administrator lockably attaches an intelligent switching device (e.g., intelligent switching device 22 of FIG. 1) to an electro/mechanical apparatus (e.g., apparatus 20 in FIG. 1). In step 404, a computer processor of the intelligent switching device retrieves (i.e., from a detection device) detection data indicating that a first individual is located within a specified proximity of the apparatus. In step 408, the computer processor receives (from a user) a request for enabling the apparatus. In step 412, the computer processor determines that the user is in compliance with safety procedures associated with operating the apparatus. Determining compliance with safety procedures may include determining that the user is wearing appropriate safety gear for operating the apparatus. Determining compliance with safety procedures may include the following procedure:

1. Retrieving (i.e., from a detection device) safety gear detection data (i.e., comprising a safety minimum rating or greater for this type of safety gear) indicating that the user is correctly wearing the specified safety gear.
2. Retrieving safety gear indication data indicating that the specified protective gear comprises a unique marking indicating a correct type of protective gear associated with the specified protective gear and using the apparatus. This may be accomplished by-retrieving an associated zone and within the zone examining an optical image for specified safety gear and optically recognizable characters (OCR).
3. Analyzing the safety gear detection data and the safety gear indication data.

In step 414, the computer processor (in response to results of step 412) generates an enable signal. In step 418, the computer processor enables a power signal for the apparatus. In step 424, the computer processor indicates that the apparatus has been enabled and is operational. In step 428, the computer processor detects safety gear issues. As a first example, the computer processor detects that the user is no longer located within the specified proximity of the apparatus. As a second example, the computer processor detects that the user is no longer in compliance with the safety procedures associated with operating the apparatus. In step 435, the computer processor disables the apparatus and step 404 is repeated to continue monitoring.

Figure 5:
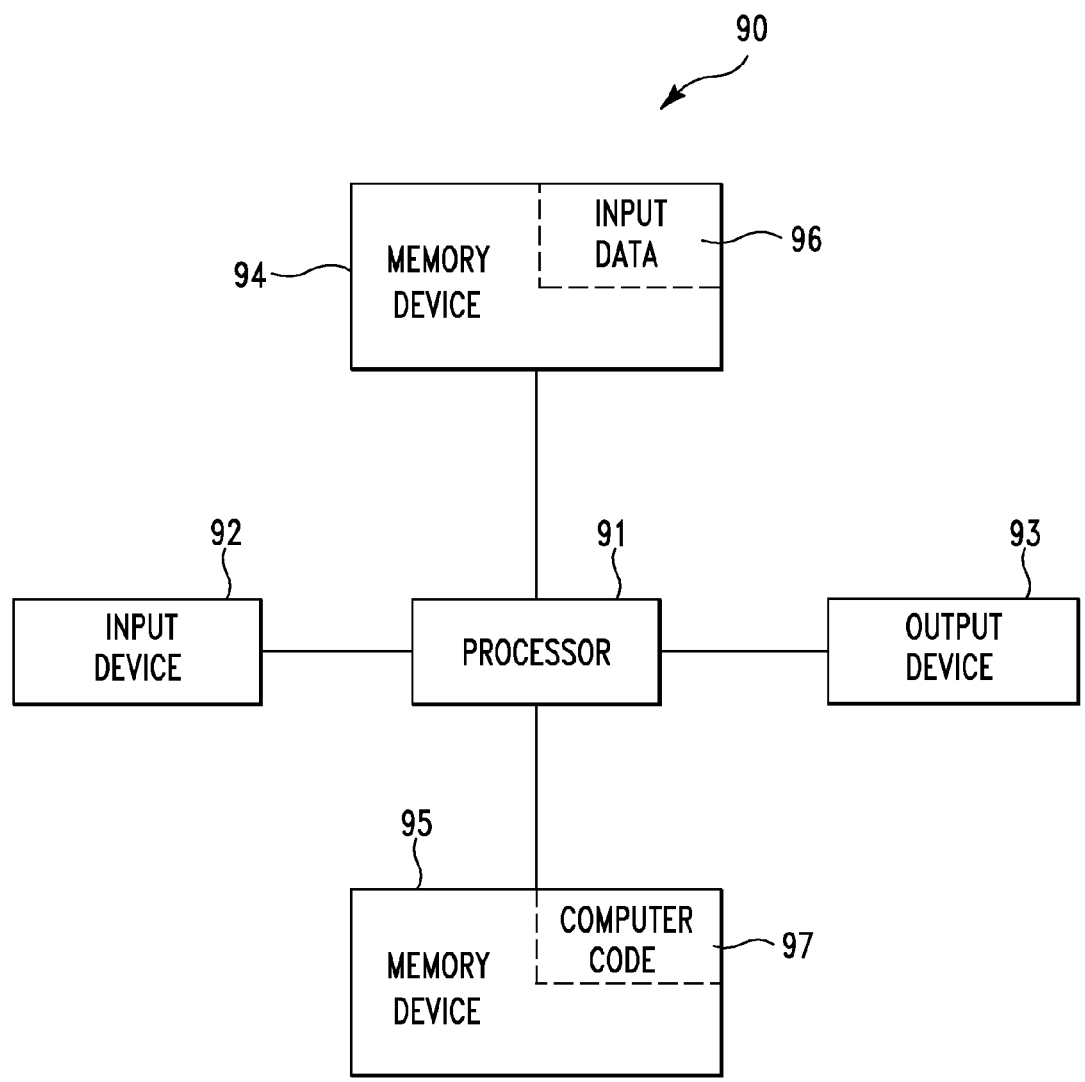
FIG. 5 illustrates a computer apparatus used to enable the intelligent switching device of FIG. 1, in accordance with embodiments of the present invention.

FIG. 5 illustrates a computer apparatus 90 (e.g., intelligent switching device 22 or computing system 10 of FIG. 1) used for enabling or disabling an apparatus, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 4) for enabling or disabling an apparatus. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithm of FIG. 4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to enable or disable an apparatus. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for enabling or disabling an apparatus. In another embodiment, the invention provides a method that performs the process steps of the invention on a subscription, advertising, and/or fee basis. That is, a service provider, such as a Solution Integrator, could offer to enable or disable an apparatus. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
retrieving, by a computer processor of an intelligent switching device from a detection device comprising a video retrieval device, first detection data indicating that a first individual is located within a specified proximity of an apparatus, wherein said intelligent switching device comprises a mechanical locking device or an electromechanical locking device lockably attaching an end to end plug of said apparatus to said intelligent switching device;
determining, by said computer processor, that said first individual is in compliance with safety procedures associated with operating said apparatus;
retrieving, by said computer processor from said detection device, first safety gear detection data indicating that said first individual is correctly wearing first specified protective gear;
retrieving, by said computer processor from said detection device, first safety gear indication data indicating that said first specified protective gear comprises a first unique marking indicating a correct type of protective gear associated with said first specified protective gear and using said apparatus, wherein said first unique marking further indicates a specified class of said first specified protective gear and a specified protection level within said specified class;
performing, by said computer processor, an optical character recognition process associated with said first unique marking, wherein results of said optical character recognition process results in decoding said first unique marking;
analyzing, by said computer processor, said first detection data, said first safety gear detection data, said first safety gear indication data, and said results of said optical character recognition process;
first determining, by said computer processor in response to results generated during a facial recognition process of said first individual, that said first specified protective gear is located within a specified unique zone on said first individual; and
enabling, by an enable signal generated by said computer processor in response to said analyzing and said first determining, a power signal for said apparatus.

2. The method of claim 1, further comprising:
retrieving, by said computer processor from said detection device, second detection data indicating that said first individual is no longer located within said specified proximity of said apparatus;
generating, by said computer processor in response to said second detection data, a disable signal;
disabling, by said disable signal generated by said computer processor, said power signal for said apparatus; and
indicating, by said computer processor, that said apparatus has been disabled and is not operational.

3. The method of claim 1, further comprising:
second determining, by said computer processor, that said first individual is in no longer in compliance with said safety procedures associated with said operating said apparatus;
generating, by said computer processor in response to said second determining, a disable signal;
disabling, by said disable signal generated by said computer processor, said power signal for said apparatus; and
indicating, by said computer processor, that said apparatus has been disabled and is not operational.

4. The method of claim 1, wherein said enable signal commands said computer processor to enable an alternating current power signal for said apparatus.

5. The method of claim 1, wherein said enable signal commands said computer processor to enable a direct current power signal for said apparatus.

6. The method of claim 5, wherein said direct current power signal is supplied by a power source selected from the group consisting of a direct current power supply, a fuel cell, and a battery.

7. The method of claim 1, wherein said intelligent switching device comprises an internal electrical switch to perform said enabling.

8. The method of claim 1, wherein said intelligent switching device comprises a universal serial bus (USB) port for said retrieving said first detection data and said receiving said request.

9. The method of claim 1, wherein said intelligent switching device comprises a wireless transceiver for said retrieving said first detection data and said receiving said request.

10. The method of claim 1, further comprising:
providing at least one support service for at least one of creating, integrating, hosting, maintaining, and deploying computer-readable code in said computing system, wherein the code in combination with the computing system is capable of performing: said retrieving, said receiving, said determining, said generating, said enabling, and said indicating.

11. A computer program product, comprising a non-transitory computer storage medium comprising a computer readable program code stored therein, said computer readable program code configured to perform a method upon being executed by a computer processor, said method comprising:

- retrieving, by said computer processor from a detection device comprising a video retrieval device, first detection data indicating that a first individual is located within a specified proximity of an apparatus, wherein said intelligent switching device comprises a mechanical locking device or an electromechanical locking device lockably attaching an end to end plug of said apparatus to said intelligent switching device;
- determining, by said computer processor, that said first individual is in compliance with safety procedures associated with operating said apparatus;
- retrieving, by said computer processor from said detection device, first safety gear detection data indicating that said first individual is correctly wearing first specified protective gear;
- retrieving, by said computer processor from said detection device, first safety gear indication data indicating that said first specified protective gear comprises a first unique marking indicating a correct type of protective gear associated with said first specified protective gear and using said apparatus, wherein said first unique marking further indicates a specified class of said first specified protective gear and a specified protection level within said specified class;
- performing, by said computer processor, an optical character recognition process associated with said first unique marking, wherein results of said optical character recognition process results in decoding said first unique marking;
- analyzing, by said computer processor, said first detection data, said first safety gear detection data, said first safety gear indication data, and said results of said optical character recognition process;
- first determining, by said computer processor in response to results generated during a facial recognition process of said first individual, that said first specified protective gear is located within a specified unique zone on said first individual; and
- enabling, by an enable signal generated by said computer processor in response to said analyzing and said first determining, a power signal for said apparatus.

12. An intelligent switching device comprising a computer processor coupled to a computer-readable memory unit, said memory unit comprising instructions that when enabled by the computer processor implements a method comprising:

- retrieving, by said computer processor from a detection device comprising a video retrieval device, first detection data indicating that a first individual is located within a specified proximity of an apparatus, wherein said intelligent switching device comprises a mechanical locking device or an electromechanical locking device lockably attaching an end to end plug of said apparatus to said intelligent switching device;
- determining, by said computer processor, that said first individual is in compliance with safety procedures associated with operating said apparatus;
- retrieving, by said computer processor from said detection device, first safety gear detection data indicating that said first individual is correctly wearing first specified protective gear;
- retrieving, by said computer processor from said detection device, first safety gear indication data indicating that said first specified protective gear comprises a first unique marking indicating a correct type of protective gear associated with said first specified protective gear and using said apparatus, wherein said first unique marking further indicates a specified class of said first specified protective gear and a specified protection level within said specified class;
- performing, by said computer processor, an optical character recognition process associated with said first unique marking, wherein results of said optical character recognition process results in decoding said first unique marking;
- analyzing, by said computer processor, said first detection data, said first safety gear detection data, said first safety gear indication data, and said results of said optical character recognition process;
- first determining, by said computer processor in response to results generated during a facial recognition process of said first individual, that said first specified protective gear is located within a specified unique zone on said first individual; and
- enabling, by an enable signal generated by said computer processor in response to said analyzing and said first determining, a power signal for said apparatus.

13. The intelligent switching device of claim 12, wherein said method further comprises:

- retrieving, by said computer processor from said detection device, second detection data indicating that said first individual is no longer located within said specified proximity of said apparatus;
- generating, by said computer processor in response to said second detection data, a disable signal;
- disabling, by said disable signal generated by said computer processor, said power signal for said apparatus; and
- indicating, by said computer processor, that said apparatus has been disabled and is not operational.

14. The intelligent switching device of claim 12, wherein said method further comprises:

- second determining, by said computer processor, that said first individual is in no longer in compliance with said safety procedures associated with said operating said apparatus;
- generating, by said computer processor in response to said second determining, a disable signal;
- disabling, by said disable signal generated by said computer processor, said power signal for said apparatus; and
- indicating, by said computer processor, that said apparatus has been disabled and is not operational.

15. The intelligent switching device of claim 12, wherein said determining that said first individual is in compliance with safety procedures associated with operating said apparatus comprises:

- retrieving, by said computer processor from said detection device, first safety gear detection data indicating that said first individual is correctly wearing first specified protective gear;
- retrieving, by said computer processor from said detection device, first safety gear indication data indicating that said first specified protective gear comprises a first unique marking indicating a correct type of protective gear associated with said first specified protective gear and using said apparatus; and
- analyzing, by said computer processor, said first safety gear detection data and said first safety gear indication data, wherein said generating is in further response to results of said analyzing.

16. The intelligent switching device of claim 12, wherein said enable signal commands said computer processor to enable an alternating current power signal for said apparatus.

17. The intelligent switching device of claim 12, wherein said enable signal commands said computer processor to enable a direct current power signal for said apparatus.

\* \* \* \* \*